(12) United States Patent
Suzuki (10) Patent No.: US 10,854,925 B2
(45) Date of Patent: Dec. 1, 2020

(54) METHOD OF MANUFACTURING WOUND ELECTRODE BODY

(71) Applicant: TOYOTA JIDOSHA KABUSHIKI KAISHA, Toyota (JP)

(72) Inventor: Shigeru Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 16/141,024

(22) Filed: Sep. 25, 2018

(65) Prior Publication Data

US 2019/0165425 A1 May 30, 2019

(30) Foreign Application Priority Data

Nov. 24, 2017 (JP) ................. 2017-226165

(51) Int. Cl.
| | | |
|---|---|---|
| *H01M 10/0587* | (2010.01) | |
| *H01M 10/04* | (2006.01) | |
| *H01M 10/05* | (2010.01) | |
| *B29C 53/56* | (2006.01) | |

(52) U.S. Cl.
CPC ... *H01M 10/0587* (2013.01); *H01M 10/0431* (2013.01); *H01M 10/05* (2013.01); *B29C 53/562* (2013.01); *Y10T 29/49108* (2015.01)

(58) Field of Classification Search
CPC ......... H01M 10/0587; H01M 10/0431; H01M 10/05; B29C 53/562; Y02E 60/122; Y02T 10/7011; Y02P 70/54; Y10T 29/49108

USPC .......................................... 156/192; 29/623.1
See application file for complete search history.

(56) References Cited

U.S. PATENT DOCUMENTS

2014/0329117 A1* 11/2014 Kubota ................... H01M 2/22
429/66
2016/0118682 A1* 4/2016 Iizuka ............... H01M 10/0431
429/94

FOREIGN PATENT DOCUMENTS

| JP | 2009-064687 A | 3/2009 |
| JP | 2009-252467 A | 10/2009 |
| JP | 5761576 B2 | 8/2015 |
| JP | 2016-173884 A | 9/2016 |

* cited by examiner

*Primary Examiner* — Carson Gross
(74) *Attorney, Agent, or Firm* — Oliff PLC (57) ABSTRACT

A method of manufacturing a wound electrode body by holding a first separator sheet between a pair of electrode sheets formed of a negative sheet and a positive sheet, laminating a second separator sheet in an outside of the pair of electrode sheets, and winding the pair of electrode sheets and the first and second separator sheets onto an outer circumferential surface of a winding core is provided. Before at least one electrode sheet of the pair of electrode sheets is attached to the winding core, a first fold line extended in a longitudinal direction of the one electrode sheet is formed in a leading part of the one electrode sheet.

6 Claims, 7 Drawing Sheets

METHOD OF MANUFACTURING WOUND ELECTRODE BODY

CROSS REFERENCE TO RELATED APPLICATIONS

This application is based upon and claims the benefit of priority from Japanese patent application No. 2017-226165, filed on Nov. 24, 2017, the disclosure of which is incorporated herein in its entirety by reference.

BACKGROUND

The present disclosure relates to a method of manufacturing a wound electrode body.

As disclosed in Japanese Unexamined Patent Application Publication No. 2009-252467, a wound electrode body used for, for example, a lithium-ion secondary battery or the like is manufactured by laminating four sheets, that is, a negative sheet, a separator sheet, a positive sheet, and a separator sheet and winding the laminated sheets on a winding core. The negative sheet and the positive sheet (electrode sheet) each have a structure in which an electrode mixture layer is formed on the surface of a belt-shaped current collector foil along the longitudinal direction.

SUMMARY

The present inventors have found the following problem regarding the method of manufacturing the wound electrode body.

In the manufacturing of the wound electrode body, it has been attempted to reduce the thickness of the current collector foil in the current electrode sheet in order to improve the performance of the wound electrode body. It has also been attempted to increase the speed at which the electrode sheet is conveyed in order to improve productivity. In accordance with the decrease in the thickness of the electrode sheet and the increase in the conveyance speed, when the electrode sheet starts to be wound around the winding core, there may be a case in which a leading part of the electrode sheet is curled up in the direction opposite to the conveyance direction and this part is wound in a folded manner. When the leading part of the electrode sheet is wound in a folded manner, this may give an adverse effect on the performance of the wound electrode body to be manufactured. In this case, the wound electrode body is determined to be defective in a test.

The present disclosure has been made in view of the aforementioned circumstances and provides a method of manufacturing a wound electrode body capable of preventing the leading part of the negative sheet and that of the positive sheet from being wound in a folded manner.

A method of manufacturing a wound electrode body according to one aspect of the present disclosure is a method of manufacturing a wound electrode body by holding a first separator sheet between a pair of electrode sheets formed of a negative sheet and a positive sheet, laminating a second separator sheet in an outside of the pair of electrode sheets, and winding the pair of electrode sheets and the first and second separator sheets onto an outer circumferential surface of a winding core, the method including: forming a first fold line that is extended in a longitudinal direction of at least one of the pair of electrode sheets in a leading part of the one electrode sheet before the one electrode sheet is attached to the winding core.

In the method of manufacturing the wound electrode body according to one aspect of the present disclosure, before at least one of the pair of electrode sheets is attached to the winding core, the first fold line that is extended in the longitudinal direction of the one electrode sheet is formed in the leading part of the one electrode sheet. Therefore, when this electrode sheet is conveyed, the leading part of the electrode sheet is hardly curled up in the direction opposite to the conveyance direction, whereby it is possible to prevent the leading part of the electrode sheet from being wound in a folded manner.

A second fold line that is extended obliquely from at least one corner part of the leading part to a center line of the one electrode sheet may be further formed. Alternatively, a pair of second fold lines that are extended obliquely from the respective corner parts of the leading part to a center line of the one electrode sheet may be formed. Accordingly, when this electrode sheet is conveyed, the corner part of the leading part of the electrode sheet is hardly curled up in the direction opposite to the conveyance direction, whereby it is possible to further prevent the leading part of the electrode sheet from being wound in a folded manner.

A difference in height of the first and second fold lines may be 0.5-10 mm. It is therefore possible to efficiently prevent the leading part of the electrode sheet from being wound in a folded manner.

The first and second fold lines may be formed using a clamping part that holds and fixes the one electrode sheet when the one electrode sheet is cut. It is therefore possible to easily form the fold lines.

A method of manufacturing a wound electrode body according to one aspect of the present disclosure is a method of manufacturing a wound electrode body by holding a first separator sheet between a pair of electrode sheets formed of a negative sheet and a positive sheet, laminating a second separator sheet in an outside of the pair of electrode sheets, and winding the pair of electrode sheets and the first and second separator sheets onto an outer circumferential surface of a winding core, the method including: forming a fold line that is extended obliquely from at least one corner part of the leading part to a center line of at least one of the pair of electrode sheets in a leading part of the one electrode sheet before the one electrode sheet is attached to the winding core.

In the method of manufacturing the wound electrode body according to one aspect of the present disclosure, before at least one of the pair of electrode sheets is attached to the winding core, the fold line that is extended obliquely from at least one corner part of the leading part to the center line of the one electrode sheet is formed in the leading part of the one electrode sheet. Therefore, when this electrode sheet is conveyed, the corner part of the leading part of the electrode sheet is hardly curled up in the direction opposite to the conveyance direction, whereby it is possible to prevent the leading part of the electrode sheet from being wound in a folded manner.

According to the present disclosure, it is possible to provide the method of manufacturing the wound electrode body capable of preventing the leading part of the negative sheet and that of the positive sheet from being wound in a folded manner.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, specific examples to which the present disclosure is applied will be explained in detail. However, the present disclosure is not limited to the following embodiments. Further, for the sake of clarity of the description, the following description and the drawings are simplified as appropriate.

First Embodiment

<Structure of Wound Electrode Body>

Figure 1:
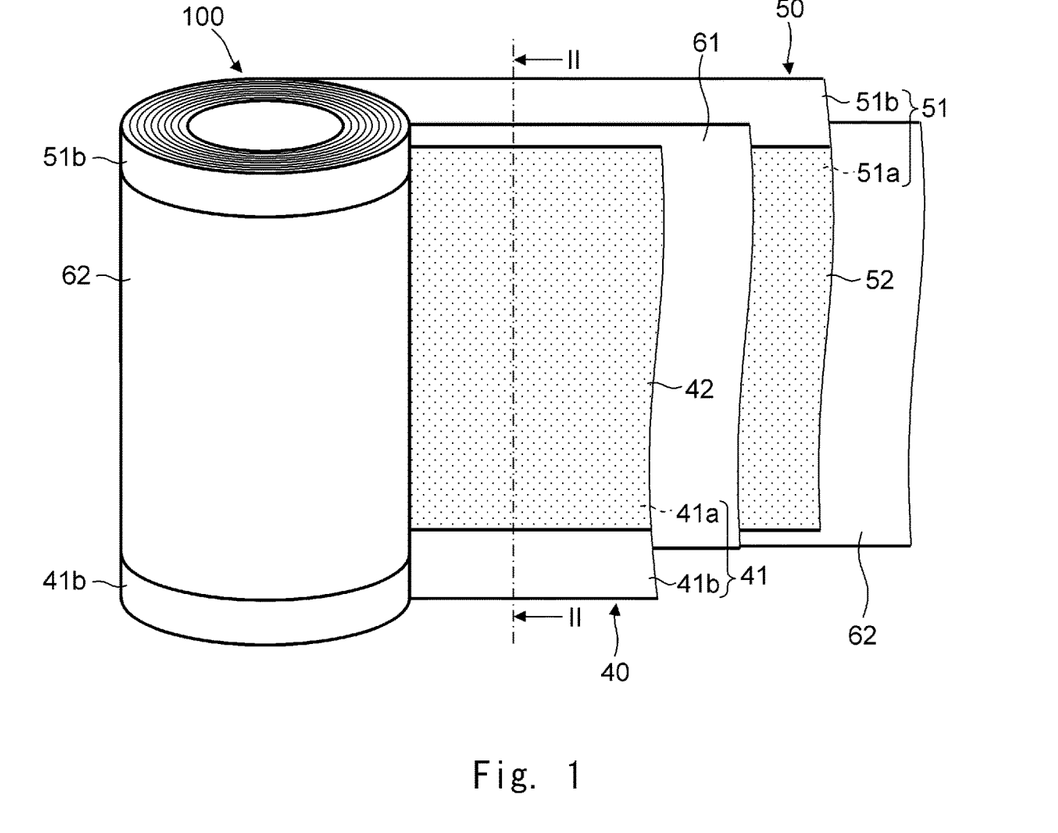
FIG. 1 is a schematic perspective view of a wound electrode body 100.
Figure 2:
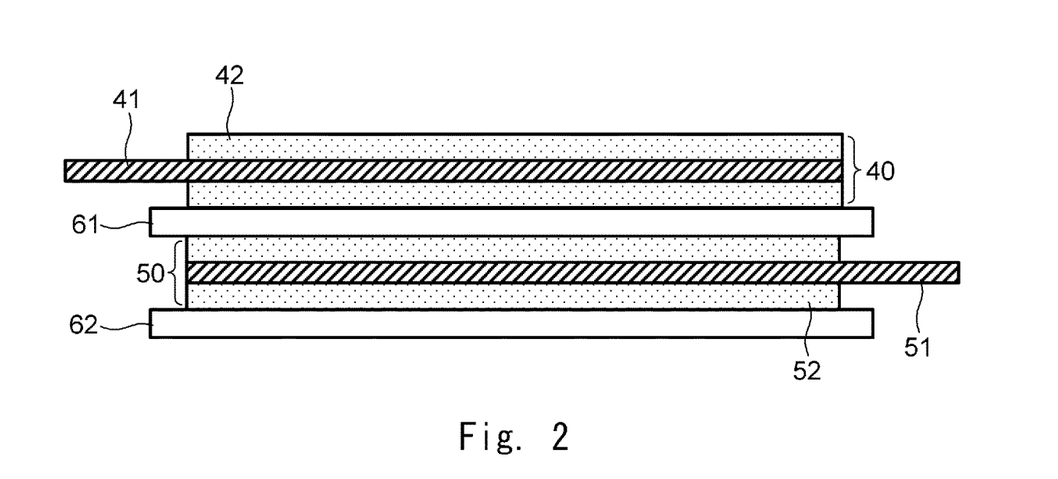
FIG. 2 is a cross-sectional view taken along the line II-II of FIG. 1.

Referring first to FIGS. 1 and 2, a structure of a wound electrode body manufactured by a method of manufacturing the wound electrode body according to a first embodiment will be explained. FIG. 1 is a schematic perspective view of a wound electrode body 100. FIG. 2 is a cross-sectional view taken along the line II-II of FIG. 1.

The wound electrode body 100 is, for example, a wound electrode body used for a lithium-ion secondary battery and the like. The wound electrode body 100 has a structure in which four sheets, that is, a negative sheet 40, an inner separator sheet (first separator sheet) 61, a positive sheet 50, and an outer separator sheet (second separator sheet) 62, are laminated in this order and the laminated sheets are wound, with the negative sheet 40 being disposed on the inner side.

As shown in FIGS. 1 and 2, the negative sheet 40 includes a negative electrode current collector foil 41 and a negative electrode mixture layer 42. The negative electrode current collector foil 41 includes a forming part 41a in which the negative electrode mixture layer 42 is formed and a non-forming part 41b in which the negative electrode mixture layer 42 is not formed and the negative electrode current collector foil 41 is exposed in one end part of the negative electrode current collector foil 41 in the width direction. As shown in FIG. 2, the negative electrode mixture layer 42 is formed on the respective surfaces of the negative electrode current collector foil 41 by, for example, coating or transfer. The negative electrode mixture layer 42 may instead be formed on one surface of the negative electrode current collector foil 41.

As shown in FIG. 1, the negative electrode mixture layer 42 is formed in a belt shape on a surface of the negative electrode current collector foil 41 along the longitudinal direction of the belt-shaped negative electrode current collector foil 41. On the other hand, in one end part (lower side of FIG. 1) of the negative electrode current collector foil 41 in the width direction, the negative electrode current collector foil 41 is exposed in a belt shape along the longitudinal direction. Therefore, the negative electrode current collector foil 41 is formed of the forming part 41a that is extended in a belt shape in the longitudinal direction so as to correspond to the negative electrode mixture layer 42 and the non-forming part 41b that is extended substantially in parallel to the forming part 41a. As one example, the width of the forming part 41a is about 110 mm, the width of the non-forming part 41b is about 10 mm, and the width of the whole negative sheet 40 is about 120 mm.

A copper foil having a thickness of 15 µm or smaller may be used, for example, for the negative electrode current collector foil 41. As one example, an electrolytic copper foil having a thickness of about 8 µm is used. The negative electrode active material that forms the negative electrode mixture layer 42 may be, for example, carbon such as graphite, metallic lithium, lithium alloy, transition metal oxide/transition metal nitride/transition metal sulfide capable of doping/undoping lithium ions, and a combination thereof. The composition of the electrode material for the negative electrode active material layer is not particularly limited and a known composition can be applied.

The negative electrode mixture layer 42 may include, for example, besides the aforementioned negative electrode active material, a binding agent such as styrene-butadiene copolymer (SBR) as a solid content. The negative electrode mixture layer 42 may further include a dispersing agent such as carboxymethylcellulose Na salt (CMC) as a solid content. Solvent that forms the negative electrode mixture layer 42 may be, for example, water. The negative electrode mixture layer 42 has a thickness of about several tens of µm.

As shown in FIGS. 1 and 2, the positive sheet 50 includes a positive electrode current collector foil 51 and a positive electrode mixture layer 52. The positive electrode current collector foil 51 includes a forming part 51a in which the positive electrode mixture layer 52 is formed and a non-forming part 51b in which the positive electrode mixture layer 52 is not formed and the positive electrode current collector foil 51 is exposed in one end part of the positive electrode current collector foil 51 in the width direction. As shown in FIG. 2, the positive electrode mixture layer 52 is formed on the respective surfaces of the positive electrode current collector foil 51 by, for example, coating or transfer. The positive electrode mixture layer 52 may instead be formed on one surface of the positive electrode current collector foil 51.

As shown in FIG. 1, the positive electrode mixture layer 52 is formed in a belt shape on a surface of the positive electrode current collector foil 51 along the longitudinal direction of the belt-shaped positive electrode current collector foil 51. On the other hand, in one end part (the upper side of FIG. 1) of the positive electrode current collector foil 51 in the width direction, the positive electrode current collector foil 51 is exposed in a belt shape along the longitudinal direction. Therefore, the positive electrode current collector foil 51 is formed of the forming part 51a that is extended in a belt shape in the longitudinal direction so as to correspond to the positive electrode mixture layer 52 and the non-forming part 51b that is extended substantially in parallel to the forming part 51a. As one example, the width of the forming part 51a is about 110 mm, the width of the non-forming part 51b is about 10 mm, and the width of the whole positive sheet 50 is about 120 mm.

An aluminum foil having a thickness of, for example, 15 μm or smaller, may be used for the positive electrode current collector foil 51. As one example, a rolled aluminum foil having a thickness of 12 μm is used. The positive electrode active material that forms the positive electrode mixture layer 52 may be, for example, lithium-containing complex oxide such as $LiCoO_2$, $LiMnO_2$, $LiMn_2O_4$, $LiNiO_2$, $LiN_{i_x}Co_{(1-x)}O_2$, and $LiNi_xCo_yMn_{(1-x-y)})_2$ (where $0<x<1$ and $0<y<1$). The composition of the electrode material for the positive electrode active material layer is not particularly limited and a known composition can be applied thereto.

The positive electrode mixture layer 52 may include, for example, besides the aforementioned positive electrode active material, a conductive material such as a carbon powder and a binding agent such as polyvinylidene fluoride (PVdF) as solid contents. Furthermore, a dispersing agent such as carboxymethylcellulose Na salt (CMC) may be included as the solid content as necessary. Solvent that composes the positive electrode mixture layer 52 may be, for example, water, N-methyl-2-pyrrolidone (NMP) or the like. The thickness of the positive electrode mixture layer 52 is about several tens of μm.

As shown in FIGS. 1 and 2, the inner separator sheet 61 is an insulation sheet held between the negative sheet 40 and the positive sheet 50. More specifically, the inner separator sheet 61 is held between the negative electrode mixture layer 42 of the negative sheet 40 and the positive electrode mixture layer 52 of the positive sheet 50. Then the non-forming part 41b of the negative sheet 40 is protruded from one end side (the lower side of FIG. 1) of the inner separator sheet 61 in the width direction and the non-forming part 51b of the positive sheet 50 is protruded from the other end side (the upper side of FIG. 1) of the inner separator sheet 61 in the width direction.

As shown in FIGS. 1 and 2, the outer separator sheet 62, which is an insulation sheet having a shape the same as that of the inner separator sheet 61, is arranged to be opposed to the inner separator sheet 61 via the positive sheet 50. In a wound state, that is, in the wound electrode body 100, the outer separator sheet 62 is also held between the negative electrode mixture layer 42 of the negative sheet 40 and the positive electrode mixture layer 52 of the positive sheet 50. Then the non-forming part 41b of the negative sheet 40 is protruded from one end side (the lower side of FIG. 1) of the outer separator sheet 62 in the width direction and the non-forming part 51b of the positive sheet 50 is protruded from the other end side (the upper side of FIG. 1) of the outer separator sheet 62 in the width direction.

A porous film having a three-layer laminated structure of polyethylene (PE)/polypropylene (PP)/polyethylene (PE) may be, for example, used for the inner separator sheet 61 and the outer separator sheet 62.

In the wound electrode body 100, a negative electrode terminal (not shown) is bonded to the non-forming part 41b in which the negative electrode current collector foil 41 is exposed and a positive electrode terminal (not shown) is bonded to the non-forming part 51b in which the positive electrode current collector foil 51 is exposed.

<Overall Structure of Apparatus for Manufacturing Wound Electrode Body>

Figure 3:
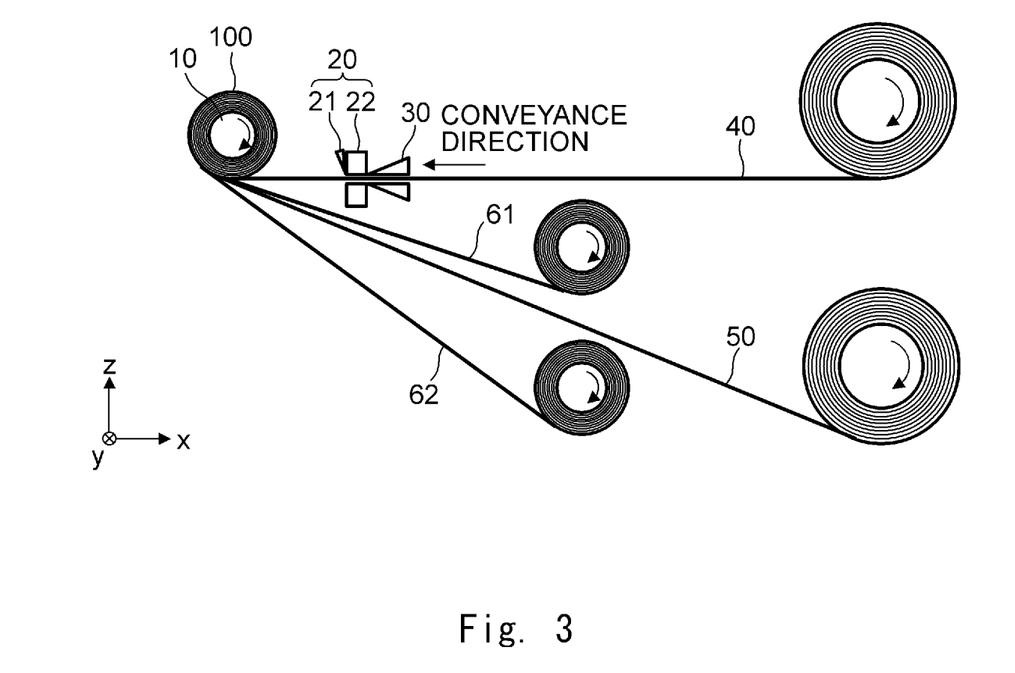
FIG. 3 is a schematic side view of a manufacturing apparatus used for a method of manufacturing a wound electrode body according to a first embodiment.

Reference next to FIG. 3, an overall structure of the manufacturing apparatus used for the method of manufacturing the wound electrode body according to the first embodiment will be explained. FIG. 3 is a schematic side view of the manufacturing apparatus used for the method of manufacturing the wound electrode body according to the first embodiment. As shown in FIG. 3, the manufacturing apparatus used for the method of manufacturing the wound electrode body according to this embodiment includes a winding core 10, a cutting machine 20, and a conveyance chuck 30.

As a matter of course, the right-handed xyz rectangular coordinates shown in FIG. 3 and the other drawings are merely convenient ones for explaining the positional relation of the components. For example, the z-axis positive direction is a vertically upward direction and the xy plane is a horizontal plane, which are common throughout the drawings.

As shown in FIG. 3, in the method of manufacturing the wound electrode body according to the first embodiment, the inner separator sheet 61 is held between the pair of electrode sheets (the negative sheet 40 and the positive sheet 50), the outer separator sheet 62 is laminated in the outside of the pair of electrode sheets, and the sheets that have been laminated to one another are wound on the outer circumferential surface of the winding core 10, whereby the wound electrode body 100 is manufactured.

The winding core 10 is a columnar or cylindrical member having an axis parallel to the y-axis. The winding core 10 is rotationally driven by, for example, a drive source such as a motor (not shown).

The cutting machine 20, which is provided to cut the negative sheet 40, includes a cutting blade 21 and a clamping part 22. The clamping part 22 is formed of, for example, a pair of blocks, each having a quadrangular prism shape and made of resin. When the negative sheet 40 is cut, the cutting blade 21 is slid in the z-axis direction along the end surface of the x-axis negative direction side (the forward side of the conveyance direction of the negative sheet 40) of the clamping part 22 while holding and fixing the negative sheet 40 by the clamping part 22. The negative sheet 40 is therefore cut into pieces having a predetermined length.

The conveyance chuck 30 is a member to hold the negative sheet 40 that has been cut and convey the leading part of the negative sheet 40 to the winding core 10 when the winding is started. The leading part of the negative sheet 40 conveyed by the conveyance chuck 30 is attached to the winding core 10. As shown in FIG. 3, the forward side of the conveyance chuck 30 in the conveyance direction may be tapered. According to this structure, the leading part of the negative sheet 40 can be easily attached to the winding core 10.

In FIG. 3, only the cutting machine 20 and the conveyance chuck 30 provided in the negative sheet 40 are drawn and a cutting machine and a conveyance chuck provided in the positive sheet 50, the inner separator sheet 61, and the outer separator sheet 62 are not shown for the sake of clarity. The cutting machine and the conveyance chuck provided in the positive sheet 50 have structures similar to those of the cutting machine 20 and the conveyance chuck 30. One characteristic feature lies in the structure of the clamping part 22 of the cutting machine 20 in the manufacturing apparatus of the wound electrode body according to the first embodiment, the details of which will be explained later.

Figure 4:
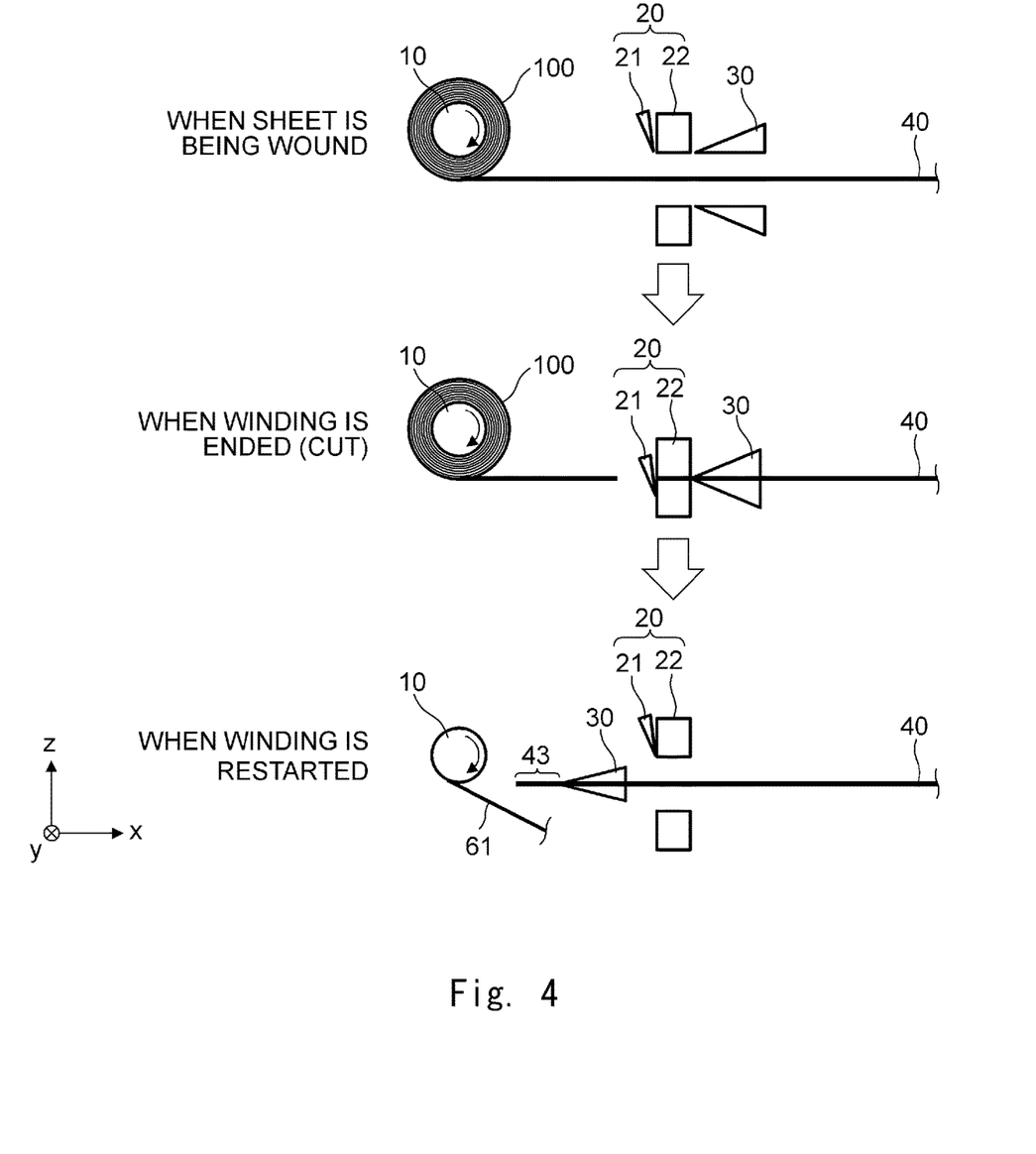
FIG. 4 is a schematic side view for describing operations of a cutting machine 20 and a conveyance chuck 30.

Referring now to FIG. 4, operations of the cutting machine 20 and the conveyance chuck 30 provided in the negative sheet 40 will be explained. FIG. 4 is a schematic side view for describing the operations of the cutting machine 20 and the conveyance chuck 30.

As shown in the upper stage of FIG. 4, while the negative sheet 40 is being wound, the cutting blade 21 recedes in the z-axis positive direction and the clamping part 22 and the conveyance chuck 30 are separated away from the negative sheet 40. In the upper stage of FIG. 4, the positive sheet 50, the inner separator sheet 61, and the outer separator sheet 62 are not shown.

As shown in the middle stage of FIG. 4, in order to end the winding of the negative sheet 40 and cut the negative sheet 40, the cutting blade 21 cuts the negative sheet 40 while holding it by the clamping part 22. More specifically, the blocks of the clamping part 22 are moved in the z-axis direction in such a way that they come close to each other and the clamping part 22 holds and fixes the negative sheet 40. The cutting blade 21 slides in the z-axis negative direction along the x-axis negative direction side end surface of the clamping part 22.

While the conveyance chuck 30 holds the negative sheet 40 in the middle stage of FIG. 4, the conveyance chuck 30 may not hold the negative sheet 40 at this stage. In the middle stage shown in FIG. 4, the positive sheet 50, the inner separator sheet 61, and the outer separator sheet 62 are not shown.

As shown in the lower stage of FIG. 4, when the winding of the negative sheet 40 is restarted, the negative sheet 40 is conveyed in the x-axis negative direction while the negative sheet 40 is being held by the conveyance chuck 30, and a leading part 43 of the negative sheet 40 is attached to the winding core 10 from which the wound electrode body 100 has been removed. The timing the inner separator sheet 61 is attached to the winding core 10 is earlier than the timing the negative sheet 40 is attached to the winding core 10, and the leading part 43 of the negative sheet 40 is inserted between the winding core 10 and the inner separator sheet 61. In the lower stage of FIG. 4, the positive sheet 50 and the outer separator sheet 62 are not shown.

<Detailed Structure of Leading Part 43 of Negative Sheet 40>

Figure 5:
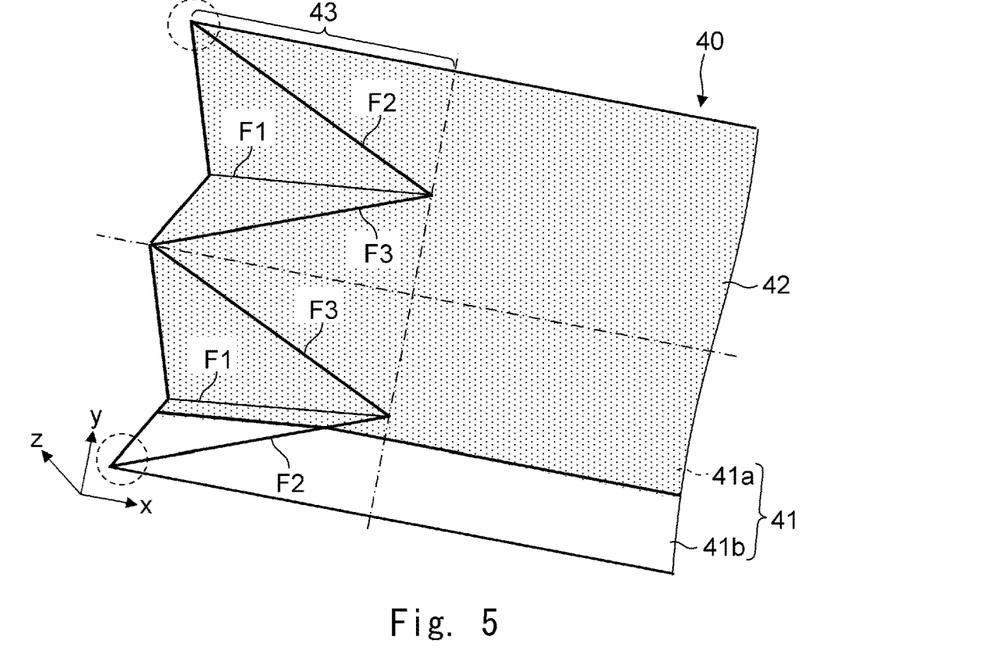
FIG. 5 is a perspective view of a leading part 43 of a negative sheet 40.
Figure 6:
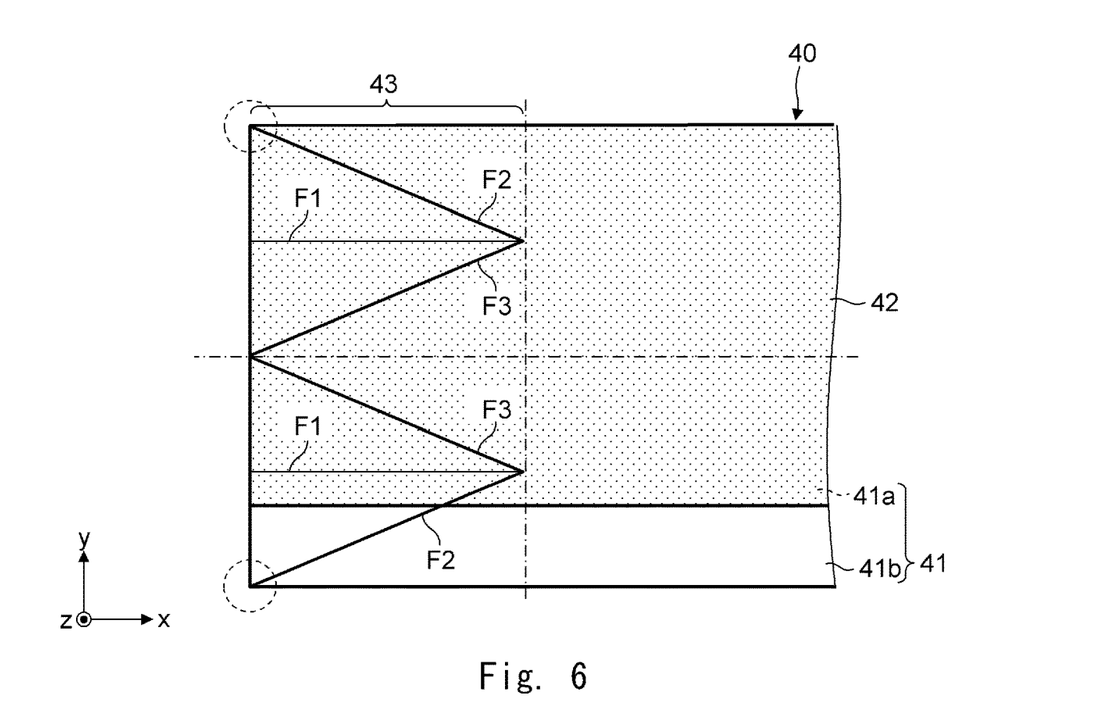
FIG. 6 is a plan view of the leading part 43 of the negative sheet 40.

Reference next to FIGS. 5 and 6, details of the leading part 43 of the negative sheet 40 will be explained. FIG. 5 is a perspective view of the leading part 43 of the negative sheet 40. FIG. 6 is a plan view of the leading part 43 of the negative sheet 40. As shown in FIGS. 5 and 6, in the method of manufacturing the wound electrode body according to the first embodiment, fold lines F1-F3 are formed in the leading part 43 of the negative sheet 40.

The length of the leading part 43 protruding from the conveyance chuck 30 in the x-axis direction is, for example, about 10-100 mm. The length of the leading part 43 in the x-axis direction is preferably short. This is because, as this length becomes shorter, the leading part 43 becomes hardly curled up in the direction opposite to the conveyance direction when it is conveyed. On the other hand, when the length of the leading part 43 in the x-axis direction is too short, it becomes difficult to attach the leading part 43 to the winding core 10.

The fold line (first fold line) F1 is a fold line that is extended in the longitudinal direction (x-axis direction) of the negative sheet 40 from the end of the leading part 43. By forming the fold line F1 extended in the longitudinal direction of the negative sheet 40, the leading part 43 of the negative sheet 40 becomes hardly curled up in the direction opposite to the conveyance direction when it is conveyed. Therefore, it is possible to prevent the leading part 43 of the negative sheet 40 from being wound in a folded manner. The length of the fold line F1 is, for example, 10 mm or larger.

While two fold lines F1 are formed in the examples shown in FIGS. 5 and 6, it is sufficient that at least one fold line F1 be formed.

The fold line (second fold line) F2 is a fold line that is extended obliquely from the corner part of the leading part 43 shown by the dashed circle toward the center line of the negative sheet 40. By forming the fold line F2 at the corner part of the leading part 43, the corner part of the leading part 43 becomes hardly curled up in the direction opposite to the conveyance direction when it is conveyed. Therefore, it is possible to prevent the leading part 43 of the negative sheet 40 from being wound in a folded manner.

In the examples shown in FIGS. 5 and 6, the back end (the x-axis positive direction side end) of the fold line F2 is connected to the back end (the x-axis positive direction side end) of the fold line F1.

While the fold line F2 is formed in each of the respective corner parts of the leading part 43 in the examples shown in FIGS. 5 and 6, it may be formed in at least one corner part of the leading part 43. Since the negative electrode mixture layer 42 is not formed in the corner part of the non-forming part 41b, the corner part of the non-forming part 41b is curled up more easily than the corner part of the forming part 41a is. Therefore, when the fold line F2 is formed in only one corner part, the fold line F2 is preferably formed in the corner part of the non-forming part 41b.

The fold line F3 is a fold line that is extended toward the back end of the fold line F1 (that is, the back end of the fold line F2) from the end center of the leading part 43. When the fold line F1 is formed to present a mountain fold, the fold lines F2 and F3 each present a valley fold. On the other hand, when the fold line F1 is formed to present a valley fold, the fold lines F2 and F3 each present a mountain fold.

The fold line F3 may not be necessarily formed. Further, by forming at least one of the fold lines F1 and F2, the leading part 43 is hardly curled up in the direction opposite to the conveyance direction when it is conveyed, whereby it is possible to prevent the leading part 43 from being wound in a folded manner.

As described above, in the method of manufacturing the wound electrode body according to the first embodiment, the fold lines F1-F3 are formed in the leading part 43 of the negative sheet 40. It is therefore possible to prevent the leading part 43 of the negative sheet 40 from being curled up in the direction opposite to the conveyance direction (in the x-axis positive direction) and being wound in a folded manner.

On the other hand, when the leading part 43 of the negative sheet 40 is attached to the winding core 10 and the winding is started, the fold lines F1-F3 are stretched and the leading part 43 becomes flat. Therefore, the performance of the wound electrode body 100 in which the fold lines F1-F3 are manufactured is not degraded.

While the negative sheet 40 has been described above, the fold lines are formed also in the leading part of the positive sheet 50, whereby the effects similar to those stated above can be obtained.

<Detailed Structure of Clamping Part 22>

Figure 7:
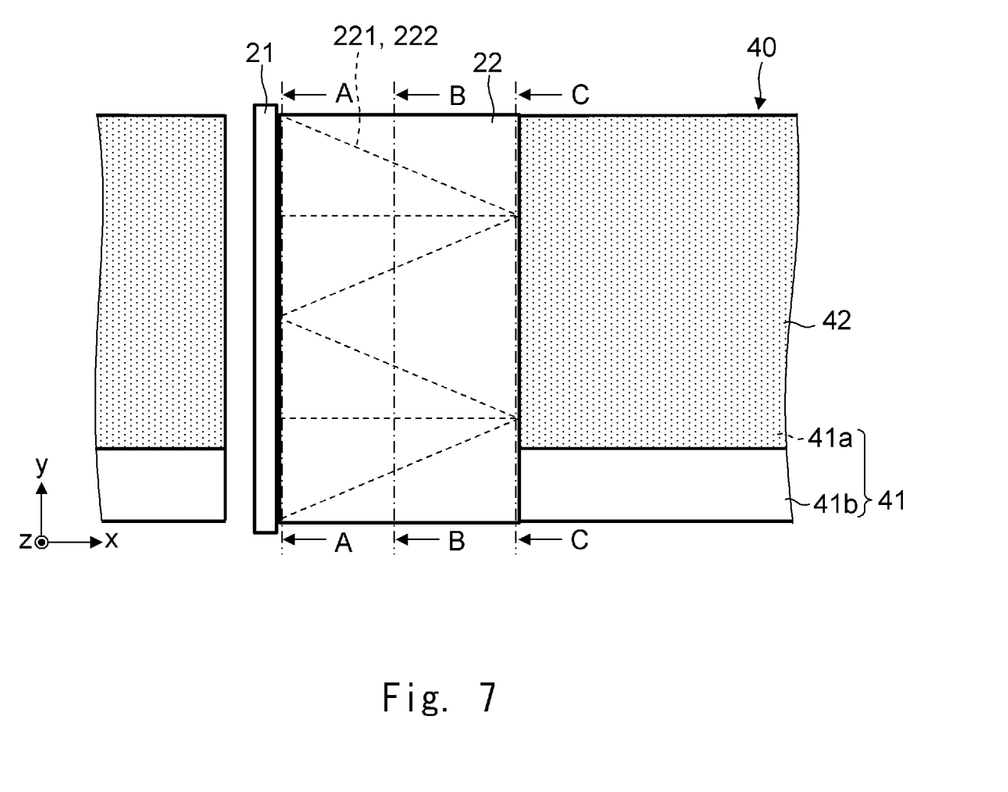
FIG. 7 is a plan view of a clamping part 22 used for the method of manufacturing the wound electrode body according to the first embodiment.
Figure 8:
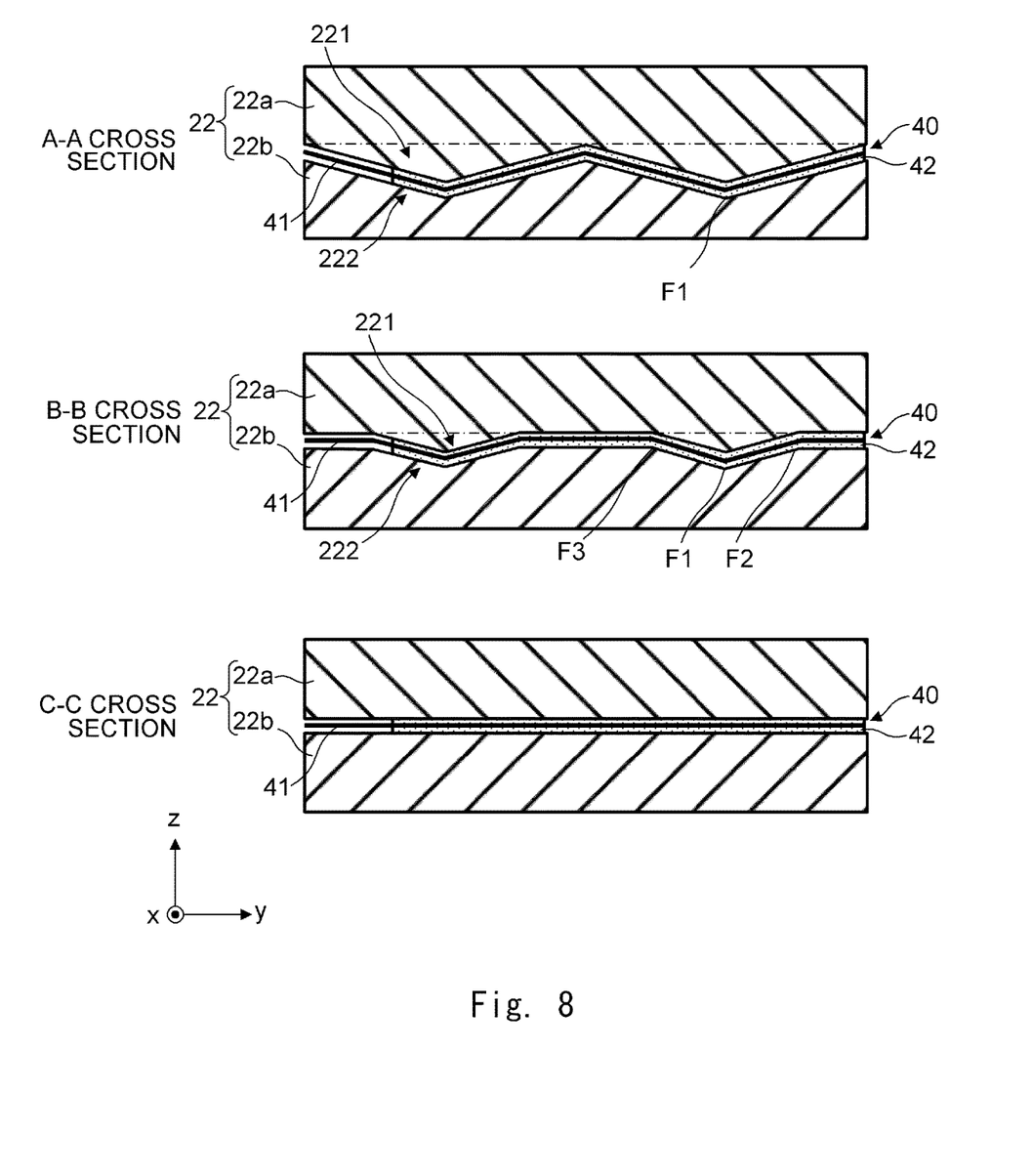
FIG. 8 is an A-A cross-sectional view, a B-B cross-sectional view, and a C-C cross-sectional view of FIG. 7.

Reference next to FIGS. 7 and 8, a detailed structure of the clamping part 22 used for the method of manufacturing the wound electrode body according to the first embodiment will be explained. FIG. 7 is a plan view of the clamping part 22 used for the method of manufacturing the wound electrode body according to the first embodiment. FIG. 8 is an A-A cross-sectional view, a B-B cross-sectional view, and a C-C cross-sectional view of FIG. 7.

FIG. 7 schematically shows a state in which the negative sheet 40 held by the clamping part 22 is cut by the cutting blade 21. In FIG. 7, the conveyance chuck 30 is not shown.

As shown in FIGS. 7 and 8, in the method of manufacturing the wound electrode body according to the first embodiment, the fold lines F1-F3 shown in FIGS. 5 and 6 are formed using the clamping part 22 that holds the negative sheet 40 when the negative sheet 40 is cut. Since the clamping part 22 is used, another device for forming the fold lines F1-F3 may not be provided, whereby it is possible to easily form the fold lines.

As shown in FIG. 8, the clamping part 22 is formed of a pair of blocks 22a and 22b each having a quadrangular prism shape. The blocks 22a and 22b are made of, for example, nylon resin. The length of the clamping part 22 in the x-axis direction is substantially the same as the length of the leading part 43 of the negative sheet 40 in the x-axis direction shown in FIGS. 5 and 6, and is, for example, about 10-100 mm.

As shown in FIGS. 7 and 8, in the mating surfaces of the block 22a, two triangular pyramid-shaped convex parts 221 configured to form the fold lines F1-F3 of the negative sheet 40 are provided in the width direction (y-axis direction). As shown in FIG. 8, the height of the convex part 221 is the highest on the x-axis negative direction side surface of the block 22a and becomes gradually low along the x-axis positive direction.

On the other hand, in the mating surfaces of the block 22b, two triangular pyramid-shaped concave parts 222 configured to form the fold lines F1-F3 of the negative sheet 40 are provided in the width direction (y-axis direction). As shown in FIG. 8, the depth of the concave part 222 is the largest on the x-axis negative direction side surface of the block 22b and becomes gradually small along the x-axis positive direction.

EXAMPLES

In the following description, Examples in which the fold lines F1-F3 are formed in the leading part 43 of the negative sheet 40 using the clamping part 22 shown in FIGS. 7 and 8 will be explained. Specifically, a change in a defective rate due to differences in height of the fold lines was investigated using a comparative example in which the fold lines are not formed in the leading part 43 and Examples 1-4 in which the fold lines F1-F3 having heights different from one another are formed.

In the comparative example and Examples 1-4, the width of the whole negative sheet 40 was 120 mm, the width of the forming part 41a was 110 mm, and the width of the non-forming part 41b was 10 mm. An electrolytic copper foil having a thickness of 8 µm was used for the negative electrode current collector foil 41. The thickness of the negative electrode mixture layer 42 was 30 µm.

In Examples 1-4, the clamping part 22 made of monomer cast nylon was used, and the length of the clamping part 22 in the x-axis direction was 30 mm.

In Examples 1 and 2, the block 22a in which the convex parts 221 each having a maximum height of 5 mm were formed and the block 22b in which the concave parts 222 each having a maximum depth of 5 mm were formed were used.

In Example 1, the fold lines F1-F3 whose difference in height was 0.5 mm were formed by applying a weak pressure.

In Example 2, the fold lines F1-F3 whose difference in height that corresponds to the maximum height of the convex parts 221 (the maximum depth of the concave parts 222) was 5 mm were formed.

In Examples 3 and 4, the block 22a in which the convex parts 221 each having a maximum height of 15 mm were formed and the block 22b in which the concave parts 222 each having a maximum depth of 15 mm were formed were used.

In Example 3, the fold lines F1-F3 whose difference in height was 10 mm were formed by applying a weak pressure.

In Example 4, the fold lines F1-F3 whose difference in height that corresponds to the maximum height of the convex parts 221 (the maximum depth of the concave parts 222) was 15 mm were formed.

As described above, in each of Examples 1-4, the fold lines F1-F3 whose differences in height were respectively 0.5 mm, 5 mm, 10 mm, and 15 mm were formed in the leading part 43 of the negative sheet 40.

In the comparative example in which the fold lines are not formed in the leading part 43 of the negative sheet 40, the clamping part made of monomer cast nylon and formed of a pair of blocks each having a quadrangular prism shape having flat mating surfaces was used.

The negative sheets 40 according to the comparative example and Examples 1-4 were conveyed at the speed of 500 mm/s, the leading parts 43 were attached to the respective winding cores 10, the negative sheets 40 were then wound around the respective winding cores 10, whereby 200 wound electrode bodies 100 were manufactured for each of the comparative example and Examples 1-4. The wound electrode bodies 100 in which the leading part 43 of the negative sheet 40 was folded among the wound electrode bodies 100 that have been manufactured have been determined to be defective. Then the defective rates of the respective Examples 1-4 when the defective rate in the comparative example was set to 100 were calculated.

Figure 9:
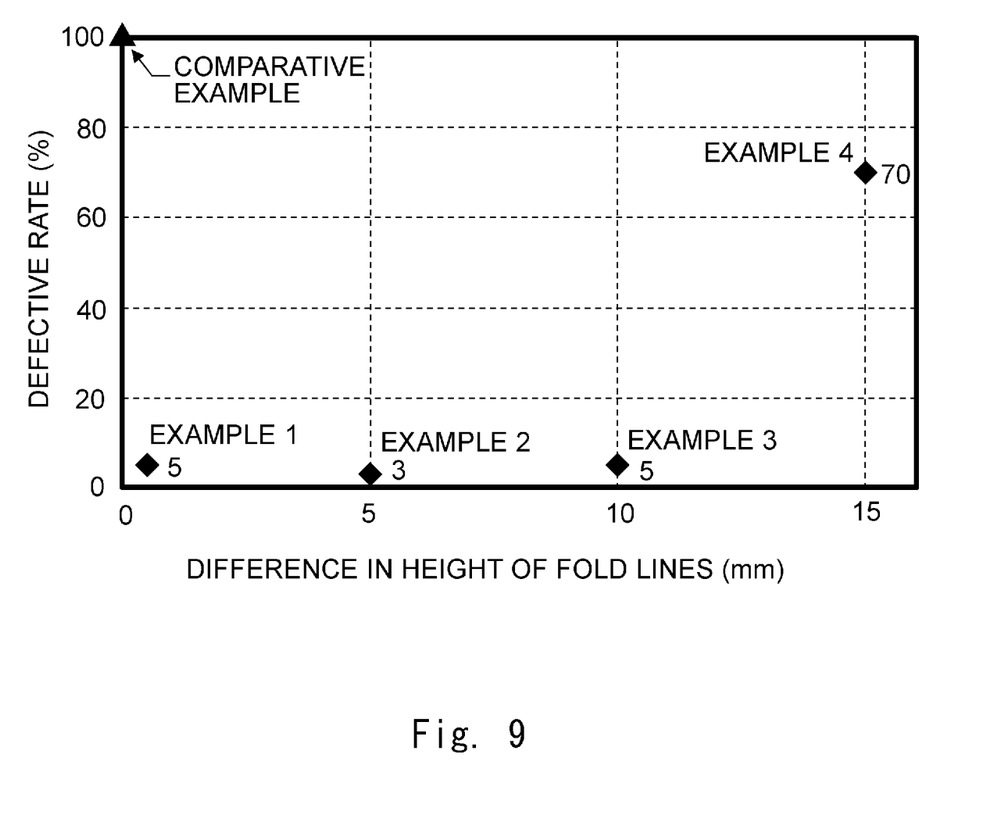
FIG. 9 is a graph showing a change in a defective rate due to differences in height of fold lines in a comparative example and Examples 1-4.

FIG. 9 is a graph showing a change in the defective rate due to differences in height of the fold lines in the comparative example and Examples 1-4. In FIG. 9, the horizontal axis indicates the difference in height of the fold lines (mm) and the vertical axis indicates the defective rate (%). Each of the numerical values attached to the data points of Examples 1-4 shown by rhombuses is the defective rate.

As shown in FIG. 9, in Examples 1-4, the defective rate was lowered to 3-70% of that of the comparative example. In Examples 1-3, in particular, the defective rate has dramatically reduced to 3-5%, that is, 1/20 or less of that of the comparative example. It has turned out from the results shown in FIG. 9 that the difference in height of the fold lines is preferably set to 0.5-10 mm.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a wound electrode body by holding a first separator sheet between a pair of electrode sheets formed of a negative sheet and a positive sheet, laminating a second separator sheet in an outside of the pair of electrode sheets, and winding the pair of electrode sheets and the first and second separator sheets onto an outer circumferential surface of a winding core, the method comprising:

forming a first fold line that is extended in a longitudinal direction of at least one of the pair of electrode sheets in a leading part of the at least one of the pair of electrode sheets before the at least one of the pair of electrode sheets is attached to the winding core.

2. The method of manufacturing the wound electrode body according to claim 1, further comprising forming a second fold line that is extended obliquely from at least one corner part of the leading part to a center line of the at least one of the pair of electrode sheets.

3. The method of manufacturing the wound electrode body according to claim 1, further comprising forming a pair of second fold lines that are extended obliquely from respective corner parts of the leading part to a center line of the at least one of the pair of electrode sheets.

4. The method of manufacturing the wound electrode body according to claim 2, wherein a difference in height of the first and second fold lines is 0.5-10 mm.

5. The method of manufacturing the wound electrode body according to claim 2, wherein the first and second fold lines are formed by using a clamping part that holds and fixes the at least one of the pair of electrode sheets when the at least one of the pair of electrode sheets is cut.

6. A method of manufacturing a wound electrode body by holding a first separator sheet between a pair of electrode sheets formed of a negative sheet and a positive sheet, laminating a second separator sheet in an outside of the pair of electrode sheets, and winding the pair of electrode sheets and the first and second separator sheets onto an outer circumferential surface of a winding core, the method comprising:

forming a fold line that is extended obliquely from at least one corner part of a leading part to a center line of at least one of the pair of electrode sheets in the leading part of the at least one of the pair of electrode sheets before the at least one of the pair of electrode sheets is attached to the winding core.

* * * * *